Patented Oct. 10, 1933

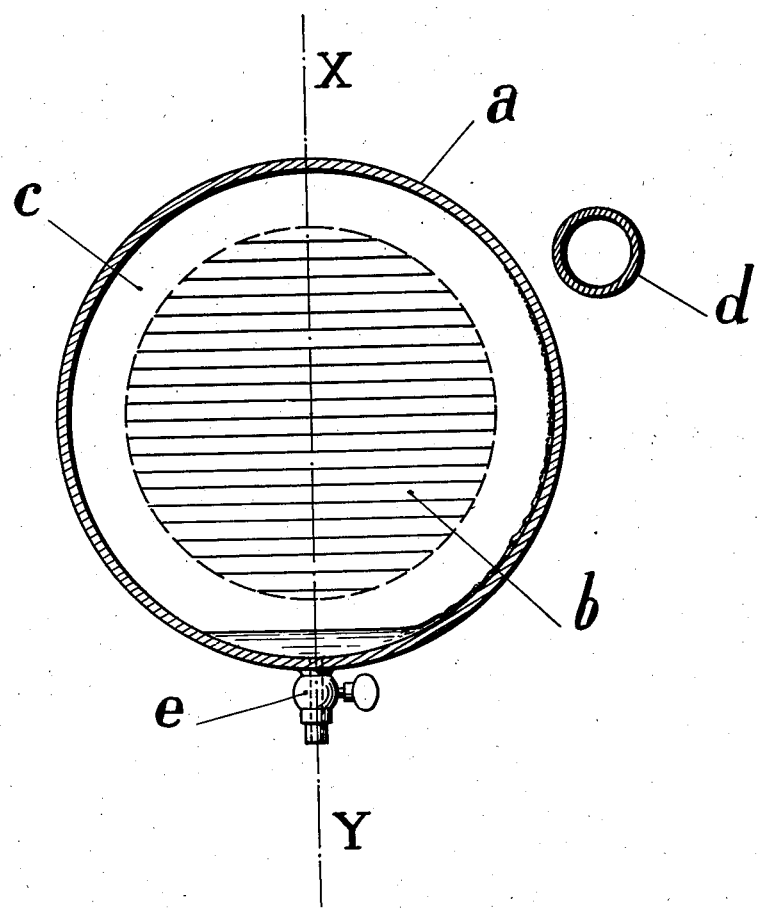

1,929,735

UNITED STATES PATENT OFFICE 1,929,735

PROCESS FOR PRESERVING EGGS

Pierre Everaert, Courtrai, Belgium

Application November 3, 1932, Serial No. 641,093, and in Belgium March 11, 1932

3 Claims. (Cl. 99—8)

This invention relates to a process for preserving eggs by cold in a gaseous mixture containing carbonic anhydride.

The object is to prevent, during the operation of preserving in an autoclave or closed vessel, the formation of carbonates on the surface of the shell of the egg and which depreciate the good appearance of same and consequently diminish its market value, because the shell becomes rough, dull and covered with a whitish deposit which is especially visible on brown eggs.

These carbonates result from the action of a solution of carbonic acid on the calcium carbonate forming the shell.

The chemical action which takes place is as follows: $CaCO_3$ (insoluble in water) $+H_2O+ CO_2 \rightleftarrows Ca(HCO_3)_2$ (soluble in water).

The only factor in this reaction which can be avoided is the water, it is therefore necessary to avoid all moisture in contact with the eggs, said moisture, as previously shown, causing the regrettable phenomenon of the formation of carbonates in presence of carbonic anhydride.

But the gaseous mixture in the autoclave or closed vessel in which the eggs are preserved is usually saturated with moisture, because of the aqueous vapour discharged from the eggs through the pores of the shell, until the gas is saturated.

According to the process of the invention, part of the autoclave or closed vessel which does not overhang the eggs and is distant from the bottom, is subjected to an excess of cold which produces:

(1st) a local concentration of the moisture contained in the gas of the closed vessel, which moisture is continually supplied by the eggs, (2nd) a cyclic circulation of said mixture, which ensures the regularity and the continuity of the condensation. This excess of cold may be regulated so as to affect the intensity of said condensation.

The device provided for the realization of the above process includes an expansion pipe for the ammonia or for the circulation of cold brine, arranged in parallel along each autoclave or closed vessel and which creates locally an excess of cold in the whole length of same, at rather greater height than that of the axis of the autoclave or closed vessel from the ground, said pipe being capable of approach or removal according to whether the intensity of the condensation is to be increased or diminished.

According to the invention, a drain cock is also arranged at the lowest point of the autoclave or closed vessel which is slightly inclined, to allow from time to time the products of condensation to be evacuated.

The details of the invention are more apparent by reference to the following description and the annexed drawing, which shows a diagrammatic section of an autoclave or closed vessel, sufficiently for the purpose of the specification.

The autoclave or closed vessel shown diagrammatically has a cylindrical outer casing $a$, inside which the eggs arranged on shelves constitute a mass marked $b$, the gaseous mixture contained between said outer casing $a$ and the mass $b$ of eggs is indicated by $c$.

The eggs contained in the closed vessel evolve aqueous vapour until the gaseous mixture mainly composed of carbonic anhydride surrounding them is saturated. This moisture, which in the presence of carbonic anhydride would cause the formation of carbonates on the shells of the eggs, is eliminated according to the invention by means of an expansion pipe for ammonia or for circulating cold brine, which causes an excess of cold localized along the casing of the closed vessel to which it is arranged in parallel. This pipe which in the drawing is shown on the right hand of the closed vessel, is on a slightly higher level than the longitudinal axis of same. By radiation and convection it causes supplementary cooling of the part of the casing in its neighbourhood and which is situated on the right of the vertical axis $x$—$y$, so that said wall is colder than the part situated on the other side of the axis $x$—$y$.

The right hand side wall of the closed vessel would for instance have a temperature of $-1°$ C. at the point opposite the refrigerating pipe $d$, whereas the opposite wall would have a temperature of $2°$ C. The inside gas $c$ saturated with aqueous vapour, is supposed to be about $3°$ C., and the eggs themselves to be at a mean temperature of $4°$ C., that is to say at a higher temperature than that of the cold air which surrounds the closed vessels, by reason of the very slow penetration of the cold into the eggs, which form a compact mass and a bad conductor of heat.

The inside gas $c$, in contact with the cold wall at $-1°$ C, may be cooled for instance from $+3°$ C. to $+1°$ C. Because of this decrease of temperature by $2°$ C., and of the following fall in the maximum pressure of the vapour in the gas of the closed vessel, 0,74 gr. of water will be liberated per m³, which condenses on the object which caused the cooling, that is to say on the wall at $-1°$ C. and then flows down to the bottom of the closed vessel, along the inclined wall as shown by the dotted line. The gas having increased in density owing to its decrease in temperature, follows a descending path and encounters the eggs at 4° C. In contact with these it is heated and dried and becomes capable of absorbing a fresh quantity of water. Having decreased in density owing to its increase in temperature, it follows the open road before it and rises along the left side wall of the closed vessel, and during this ascending path it comes in contact with the wall at 2° C. and the eggs at 4° C. It therefore continues to be heated and as it is relatively dry it absorbs the aqueous vapour which are emitted from the eggs through their shells. The gas arrives approximately saturated at the top of the closed vessel and continues its path towards the right along the wall at −1° C. where in consequence of its being cooled and absorbing water again it becomes completely saturated. When it arrives near the pipe d, that is to say in the coldest zone of the closed vessel, condensation occurs again as above and the cycle recommences.

A drain cock e placed at the lowest point of the closed vessel enables the condensed water to be run off. Since there is always an overpressure of gas in the closed vessel (from 20 to 30 cm of water), it suffices to open the drain cock to evacuate the products of condensation. It is then seen how much these amount to and the distance of the cooling pipe from the closed vessel or the ammonia or brine fed to the pipe can be regulated. Further a source of moisture and of bad smells is thus eliminated. The loss of weight per egg will not be important, in fact suppose that during the preserving 100 litres of water at most are discharged through the drain pipe, for a closed vessel for one million eggs, this represents 1 centigramme of water per egg.

I would call attention to the advantages resulting from the position chosen for the refrigerating pipe: the drops of water formed on the cold wall of the closed vessel slide down the slope of the latter and reunite at the bottom of the closed vessel where the drain cock is placed; the condensation is regular and continuous owing to the circulation of the gas; this circulation ensures better preserving, since the quicker cooling of the eggs causes them to absorb the gas more rapidly, the dissolving of carbonic anhydride in a liquid being inversely proportional to the temperature; further the humidity of the layer of gas directly touching the surface of the shell is most important; when there is no circulation the gas next to the egg will become saturated by the continuous diffusion of the water in the egg through the pores of the shell, whereas when the gas is in motion, the moisture in the gas next to the eggs will be the same as in the gas of the closed vessel.

All these advantages cannot be obtained by placing the cooling pipe in any other position at random. If it is placed beneath the top of the closed vessel, the drops of water formed there would fall on the eggs and help the phenomenon which it is the object of the invention to suppress. If it is placed in an intermediate position between that chosen according to the invention and the bottom of the closed vessel, the circulation of the gas would be very slow or non-existent, which is also contrary to the object of the invention.

I claim:

1. A process for preserving eggs, which consists in placing the eggs in a refrigerating chamber inside an autoclave containing a gaseous mixture mainly carbonic anhydride, subjecting the wall of the autoclave which does not overhang the eggs and is distant from the bottom, to an excess of cold thereby causing local condensation of moisture exhaled by the eggs to be absorbed by the gaseous mixture, said excess of cold causing at the same time a cyclic circulation of said mixture, downward on the side of cold application and upward on the opposite side and ensuring the regularity and the continuity of the condensation.

2. A process according to claim 1, in which the excess of cold is regulated in order to affect the intensity of the condensation.

3. A process according to claim 1, in which the excess of cold is regulated in order to affect the intensity of condensation by periodically cleansing the autoclave with condensation water.

PIERRE EVERAERT.